United States Patent

Spirk et al.

[11] 3,935,488
[45] Jan. 27, 1976

[54] METHOD OF OPERATING A FLUID-COOLED HYDROPOWER GENERATOR

[75] Inventors: Franz Spirk; Werner Leistner, both of Berlin, Germany

[73] Assignee: Siemens Aktiengesellschaft, Munich, Germany

[22] Filed: Oct. 21, 1974

[21] Appl. No.: 516,508

[30] Foreign Application Priority Data
Oct. 30, 1973 Germany............................ 2354690

[52] U.S. Cl.................................... 310/53; 290/52
[51] Int. Cl.² ........................................ H02K 9/00
[58] Field of Search ................... 310/52, 58, 64, 53; 290/52; 165/1, 47

[56] References Cited
UNITED STATES PATENTS

| | | |
|---|---|---|
| 3,024,366 | 3/1962 | Yanagimachi ........................ 290/52 |
| 3,778,647 | 12/1973 | Leistner ................................. 310/58 |
| 3,822,389 | 7/1974 | Kudlacik ................................ 310/53 |
| 3,835,663 | 9/1974 | Appleton .............................. 310/52 |

*Primary Examiner*—Albert W. Davis, Jr.
*Assistant Examiner*—Daniel J. O'Connor
*Attorney, Agent, or Firm*—Kenyon & Kenyon Reilly Carr & Chapin

[57] ABSTRACT

The method includes maintaining the coolant circulation in a fluid-cooled hydropower generator also when the hydropower generator is shut down, and interrupting only the coolant circulation of the heat exchangers when the generator is in the shutdown condition. The leakage and conductivity control means of the circulation system are in constant operation.

2 Claims, 1 Drawing Figure

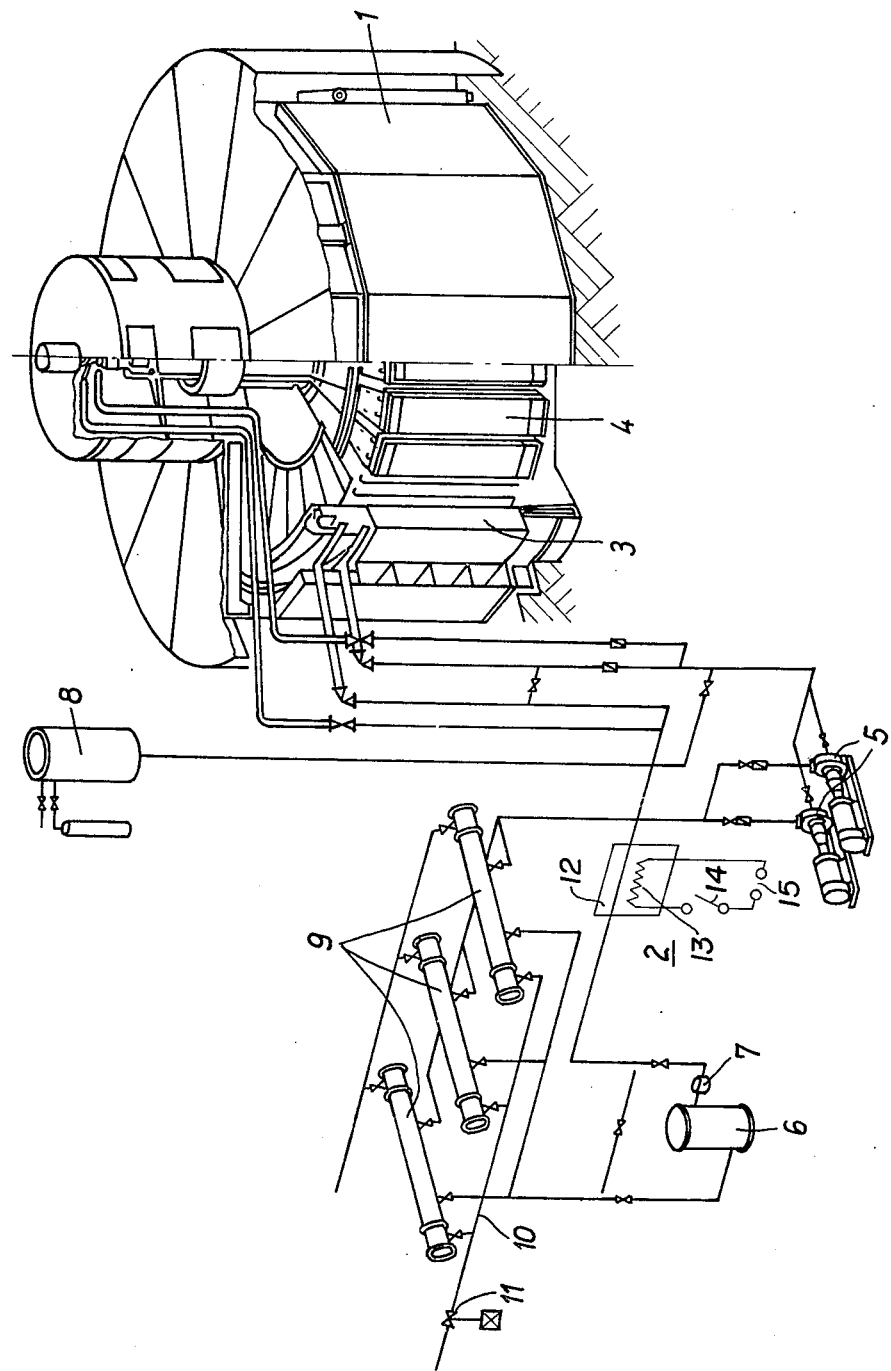

METHOD OF OPERATING A FLUID-COOLED HYDROPOWER GENERATOR

BACKGROUND OF THE INVENTION

High capacity electric hydropower generators are often liquid-cooled. For this purpose, the windings of the stator and/or rotor, and under circumstances the lamination stack, too, are provided directly or indirectly with cooling channels through which the coolant, usually water, is conducted. The pump-driven coolant, which must be specially prepared so it will contain no contaminants or be too conductive, circulates in a closed cooling system containing, among others, mechanical and chemical filters and conductivity control means. Also provided are means to check for possibly occurring leaks to prevent the loss of prepared coolant. To recool the coolant which was heated up during its circulation by the running hydropower generator, liquid-cooled heat exchangers are provided which are likewise included in the circulatory cooling system.

It is common practice to interrupt the coolant circulation in the cooling system as well as the supply of liquid to the heat exchangers when the hydropower generator is not in operation. Simultaneously with restarting the hydropower generator, the water cooling system is switched on again so that the cold coolant is conducted through the machine which is not yet warmed up, the consequence of which can be that the voltage-carrying components are cooled so much that condensate forms thereon; this, however, gives rise to the formation of creepage paths.

SUMMARY OF THE INVENTION

It is an object of the invention to provide a method of operating a fluid-cooled hydropower generator of the type described above in such a manner that condensate cannot form when the generator is restarted.

According to the method of the invention, the above object is realized by maintaining the coolant circulation and the leakage control means when the hydropower generator is shut down and interrupting only the coolant circulation of the heat exchangers. This means that the coolant circulates constantly in the cooling system also after all parts of the shut-down hydropower generator have meanwhile assumed room temperature. However, the pumps causing the coolant to circulate consume a certain amount of energy which is converted to heat heating the coolant. The pump energy, therefore, heats the coolant to a certain temperature and this, in turn, results in a corresponding heating of the liquid-carrying parts relative to their environment. Accordingly, the heat loss of the pumps acts like a shutdown heating system. This affords the advantage that no condensate can form on the voltage-carrying parts of the machine when it is again started because these parts are warmer than their environment.

In addition, because of the fact that leakage control is maintained at all times, the perfect working condition of the circulatory cooling system can be checked any time. This assures that the machine is in constant operating readiness and that defects possibly occurring during the shut-down period can be eliminated before the hydropower generator is restarted. This is of particular advantage when hydropower generators of a pump storage facility or of a power station for peak loads are involved which must be started on very short notice and run at full capacity quickly.

Should the energy loss in the cooling system be insufficient because of the particular pumps installed, it is recommended that an additional heater for the coolant be provided which can be switched on when the hydropower generator is shut down and switched off when in operation.

Although the invention is illustrated and described herein as a method of operating a fluid-cooled hydropower generator, it is nevertheless not intended to be limited to the details shown, since various modifications may be made therein within the scope and the range of the claims. The invention, however, together with additional objects and advantages will be best understood from the following description and in connection with the accompanying drawing.

BRIEF DESCRIPTION OF THE DRAWING

The drawing is a schematic diagram of a liquid-cooled hydropower generator and its circulatory cooling system. The hydropower generator could be part of a pump storage facility or of a power station for peak loads and is suitable for performing thereon the method according to the invention.

DESCRIPTION OF THE PREFERRED EMBODIMENTS OF THE INVENTION

The stator 3 and the rotor 4 of the hydropower generator 1 shown in the drawing are cooled by water circulating in a closed cooling system 2 for liquid coolants. This coolant is pumped by motor-driven pumps 5. Since the coolant for cooling a hydropower generator 1 must be kept at a particular purity level and also within a certain conductivity range, mechanical filters 6 and magnetic separators 7 are provided in the circulatory cooling system 2, in addition to chemical filters and means for conductivity control (not shown). At the highest point of the cooling system 2 there is provided an expansion tank 8 which takes up the difference in the coolant volume at different temperatures and also contains means for the leakage control which means respond immediately to changes in the coolant volume caused by other than normal temperature variations.

The coolant circulating in the closed cooling system 2 is recooled in heat exchangers 9. The heat exchangers 9, in turn, are cooled by a separate cooling system 10 for liquid coolants. This liquid coolant circulation 10 for the heat exchangers 9 can be interrupted by a valve 11.

When the hydropower generator 1 is operated in accordance with the method of the invention, the pumps 5 are running constantly, regardless of whether the hydropower generator 1 is operating or not. In contrast thereto, the coolant circulation 10 of the heat exchangers 9 is interrupted by means of the valve 11 when the hydropower generator 1 is shut down. In other words, the coolant circulation 2 for the hydropower generator 1 continues to operate when the generator 1 is not in operation. This means that, after the gradual cooling of the hydropower generator 1, as the coolant is heated slightly due to the heat loss of the pumps 5, the liquid-carrying parts of the hydropower generator 1 are also heated; this achieves the result that these parts are always slightly warmer than their environment. This affords the advantage of precluding the formation of condensate on the voltage-carrying components of the machine when the hydropower generator 1 is restarted.

In case the power loss of the pumps is insufficient to heat the coolant to the extent desired, an additional heater 12 is provided. It consists of a resistor 13 disposed adjacent to the coolant line and connected to a voltage source 15 through a switch 14. The switch is closed when the hydropower generator 1 is shut down and opened when it is restarted.

Furthermore, the leak and conductivity checking means in the coolant system 2 are kept in operation constantly by the method according to the invention. Therefore, they check the working condition of the cooling system 2 constantly and immediately signal leaks or inadmissible changes in conductivity. Therefore, the hydropower generator 1 is always in operating readiness with a completely functional circulatory coolant system 2. For this reason, the method according to the invention is particularly well suited for the operation of hydropower generators of a pump storage facility or for hydropower generators intended to cover peak loads and which are started and stopped several times a day. Such machines must be brought from standstill to full capacity within very short periods of time.

What is claimed is:

1. A method of operating a fluid-cooled hydropower generator of a hydroelectric facility such as a pump storage plant, the generator being alternately in the active and shutdown condition as required and being equipped with: a circulation system for conducting fluid coolant for cooling the generator, the circulation system including control means for controlling system leaks and the conductivity of the fluid coolant; a heat exchanger connected into the circulation system for cooling the fluid coolant, the heat exchanger, in turn, having its own circulation system for fluid cooling the same; and, a pump for pumping the fluid coolant of the circulation system through the heat exchanger and the circulation system, the method comprising the steps of: maintaining the operation of said pump and said control means when the hydropower generator is in the shut-down condition to pump the fluid coolant through said circulation system and said heat exchanger; and, interrupting the circulation system for fluid cooling said heat exchanger when the hydropower generator is in the shut-down condition.

2. The method of claim 1 wherein the circulation system of the generator is equipped with a heater which can be turned on to impart heat to the fluid coolant pumped through the circulation system by said pump, the method including the further step of turning said heater on when the hydropower generator is in the shut-down condition and turning said heater off when the hydropower generator is in the active condition.

* * * * *